July 15, 1969  F. E. MILLER  3,455,002

MULTIPLE INSERT CUTTING TOOL

Filed April 7, 1967  2 Sheets-Sheet 1

INVENTOR
FLOYD E. MILLER

BY
ATTORNEYS

July 15, 1969  F. E. MILLER  3,455,002
MULTIPLE INSERT CUTTING TOOL
Filed April 7, 1967  2 Sheets-Sheet 2
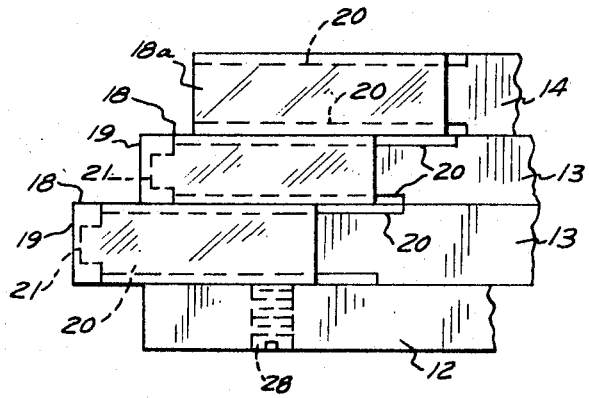
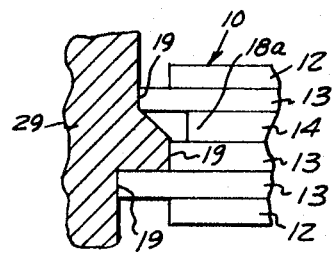
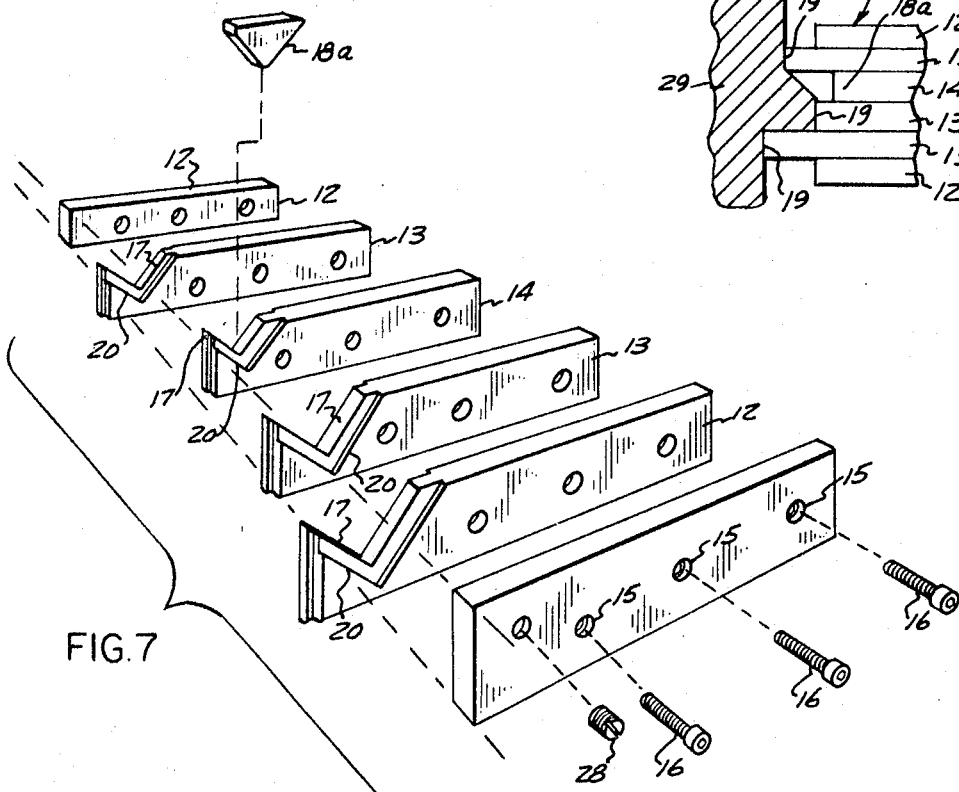
INVENTOR
FLOYD E. MILLER
BY Cullen, Sloman, & Cantor
ATTORNEYS 3,455,002
MULTIPLE INSERT CUTTING TOOL
Floyd E. Miller, Troy, Mich., assignor to Posa-Cut Corporation, Farmington, Mich., a corporation of Michigan
Filed Apr. 7, 1967, Ser. No. 630,175
Int. Cl. B23b 29/24
U.S. Cl. 29—97        2 Claims

ABSTRACT OF THE DISCLOSURE

A multiple insert cutting tool formed of a number of holder plates laminated together to form the tool body, with all, but the outermost plates having upwardly and forwardly opening, notch-like tool insert pockets receiving inserts releasably clamped together, and with at least some of the inserts formed with cutting edges. The plates are of different, predetermined lengths to thereby locate the cutting edges in parallel, spaced apart planes, so that the tool simultaneously cuts a workpiece in a predetermined number of places and depths.

DISCLOSURE

Attempts have been made in the past to combine into a single cutting tool a number of parallel, but offset, cutting edges for simultaneously making a number of different cuts upon a workpiece. However, in the case of tools using triangular shaped cutting inserts, combining such inserts has been costly and thus impractical for many uses. One reason is that, prior art tools used inserts with identical inscribed circle dimensions, with their vertices aligned, so that the deepest cut determined the choice of the inscribed circle size. This practice required a large variety of sizes of inserts, including the use of relatively large inserts, thereby increasing the cost of the tool.

Hence, it is an object of this invention to provide a cutting tool which utilizes triangular shaped carbide cutting inserts for simultaneously cutting, in one direction, a number of cuts of different depths and widths, wherein each cutting insert is supported in a pocket formed in a separate plate, with the lengths of the plates varied to properly locate the insert cutting edges, thus permitting use of smaller inserts, and even equal size inserts, for cutting different depths, and with the plates being laminated together to form the tool body.

Another object of this invention is to provide a multiple insert cutting tool formed of laminated plates, each having a notch-like insert receiving pocket, which is prelocated relative to the desired depth cut, by varying the lengths of the plates, but with the pockets overlapping so that the inserts may be transversely clamped together in face to face contact.

These and other objects and advantages of this invention will become apparent upon reading the following description of which the attached drawings form a part.

In these drawings:

FIG. 6 is an enlarged, top plan view of a portion of the tool.

FIG. 7 is a perspective exploded view of the plates forming the laminated cutting tool body.

FIG. 8 is a fragmentary, schematic top plan view, showing the operation of the tool against a workpiece.

Figure 1:
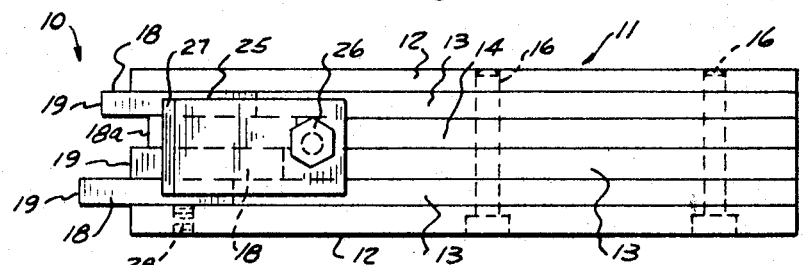
FIG. 1 is a top plan view of the multiple insert cutting tool herein.
Figure 3:
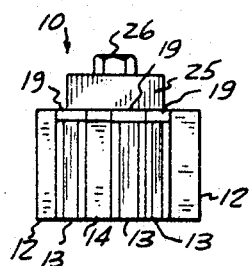
FIG. 3 is a front elevational view thereof.
Figure 2:
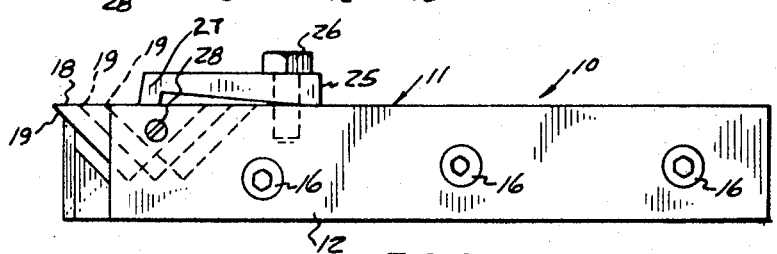
FIG. 2 is a side elevational view of the tool.
Figure 4:
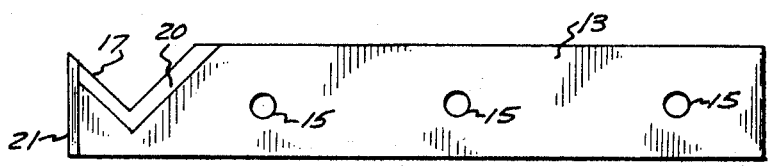
FIG. 4 is an elevational view of a single, pocketed plate.

Referring to FIGS. 1 and 7 the multiple insert cutting tool 10 is formed of a tool body 11 made up of a lamination of side plates 12, pocketed plates 13 and one or more spacer plates 14 each provided with bolt holes 15, through which bolts 16 are inserted for securing the plates together in face to face alignment. As illustrated, the plates are all the same height but they may vary in thickness and in length.

The plates are provided with notch-like pockets 17 shaped to receive conventional triangular shaped cutting inserts 18 of the hard carbide type, or in the case of spacer plate 14, with a dummy insert 18a, which has a blunted tip, not used for cutting (see FIG. 7).

The carbide inserts, being in the form of equilateral triangles, have three cutting edges 19. By removing and turning each insert, each time a cutting edge wears out, the cutting edges are successively used. After all three cutting edges are worn, the inserts are discarded and replaced with new inserts. This type of insert is conventional.

Figure 5:
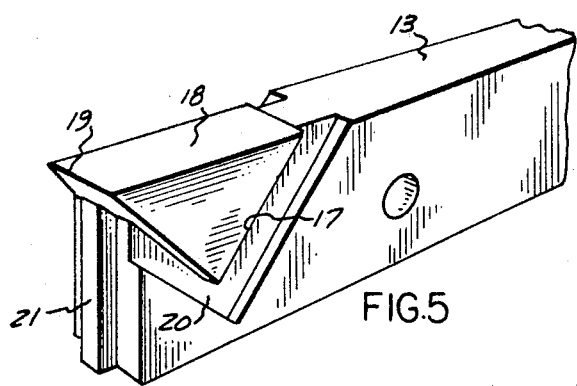
FIG. 5 is an enlarged perspective view of a portion of an insert carrying pocketed plate.

As illustrated in FIG. 5, the insert 18 is arranged with its one cutting edge 19 extending slightly forwardly or outwardly of the plate 13, that is, outwardly of the socket 17 which socket opens upwardly and forwardly for that purpose.

Each pocket is provided with a slightly recessed border 20, of the order of a few thousandths of an inch, as shown in exaggerated fashion in FIGS. 5 and 6. In addition, its forward end is provided with a narrow end support column portion 21 for engaging just beneath the cutting edge 19 for providing firm support for the cutting edge. As shown in FIG. 6 the recessed borders are of sufficient length to permit adjacent inserts to contact each other face to face and avoid contact between an insert and its adjacent plate.

The inserts are all clamped down into their pockets by means of an insert clamping plate 25 secured by a clamp bolt 26 to the laminated body so that its forward or clamping edge 27 presses downwardly and seats each of the inserts within its respective pocket. The threaded bolt hole to receive the clamp bolt 26 is formed in the laminated tool body after the various plates are secured together by the bolt 16, after which a hole may be drilled and tapped to receive the clamp bolt 26.

In addition, the inserts are all clamped together, transversely, in face to face contact by a transverse clamping means, such as a suitable screw 28, or by means of a locking cam such as disclosed in application, Ser. No. 574,037, filed by Kopy and Dubs on Aug. 22, 1966, for a cutting tool, such application having common assignee with this application.

As can be seen in FIGS. 1 and 8, the pocketed plates 13 are of sufficient length so as to properly locate their respective inserts for the required depths of cut, in each instance permitting only a small portion of the cutting edge 19 to be exposed so that each insert is properly supported within its pocket. Thus, the inserts may all be of the same size, although possibly varying in thickness for different thicknesses of cuts and yet each is properly supported and properly located simply by the adjustment of the length of its respective supporting plate.

For some cutting purposes, it may be desirable to use different sized cutting inserts or cutting inserts whose edges may be configured for special cutting purposes, such as for cutting chamfers, and this is accomplished simply by adjusting the size of the receiving pocket 17.

FIG. 8 illustrates, schematically, the cutting tool 10 with the three cutting edges 19 arranged to contact a workpiece 29, which may be, for example, a piece of metal turned upon a lathe. By the use of the required number of spacer plates 14, with their dummy inserts 18a, the cutting inserts may be properly located to space them apart into their cutting positions. More or less spacer plates may be used as needed in order to cut the maximum number of cuts upon the workpiece with a single tool.

The tool 10 is properly supported upon a machine tool by using conventional tool holders. Thus, it may be easily secured upon a lathe or shaper or other machine tool in the conventional manner, as is known in the art.

This invention may be further developed within the scope of the following claims. Accordingly, it is desired that the foregoing description be read as being merely illustrative of an operative embodiment of this invention, and not in a strictly limited sense.

Having fully described an operative embodiment of this invention, I now claim:

1. For holding a plurality of individual tool bits, each of a flat equilateral triangular shape, and each having a transverse cutting edge; a laminated tool body comprising;
a plurality of alined flat vertically arranged bit holding plates;
means for clamping said plates together firmly;
each plate having an angular V notch in its upper edge at its forward end for receiving a tool bit in vertical position;
the plates and notches being arranged so that each notch at least partially but only partially overlap the adjacent notches whereby vertically arranged bits in the notches will partially but only partially overlap one another;
the notches having reliefs to insure that adjacent bits engage each other and that each bit has minimal engagement with adjacent plates.

2. A tool body according to claim 1 wherein the forward vertical face of each plate is relieved at its vertical edges.

References Cited

UNITED STATES PATENTS

| | | | |
|---|---|---|---|
| 1,835,958 | 12/1931 | Luers | 29—97 |
| 3,180,006 | 4/1965 | Emmons | 29—97 |

FOREIGN PATENTS 810,512  3/1959  Great Britain.

HARRISON L. HINSON, Primary Examiner